United States Patent [19]

Aiti

[11] 4,014,303
[45] Mar. 29, 1977

[54] DEVICE FOR IMPROVED EFFICIENCY IN INTERNAL COMBUSTION

[76] Inventor: Guglielmo Aiti, Via Fratelli Spazzoli 33, Forli, Italy

[22] Filed: Apr. 23, 1975

[21] Appl. No.: 570,793

[30] Foreign Application Priority Data

May 7, 1974 Italy .................. 22386/74

[52] U.S. Cl. .................. 123/124 R; 123/119 D; 123/119 C; 123/141; 261/63; 48/180 R
[51] Int. Cl.² .................. F02M 23/04
[58] Field of Search ....... 123/119 D, 124 R, 124 B, 123/26, 141, 119 C; 48/180 R, 180 M; 261/DIG. 51, 63

[56] References Cited

UNITED STATES PATENTS 1,870,411  8/1932  Horscroft .................. 261/63

Primary Examiner—Ronald H. Lazarus
Attorney, Agent, or Firm—Haseltine, Lake & Waters

[57] ABSTRACT

Device for improved efficiency in internal combustion engines of motor-vehicles, comprising an air compressor supplying air downstream of the engine carburetor to which the device is applied. The air passage is controlled by a valve connected to the carburetor throttle. Downstream of the carburetor is a propeller which is rotatably driven by air supplied from the compressor and atomizes the fuel perfectly for mixing it with air.

4 Claims, 4 Drawing Figures

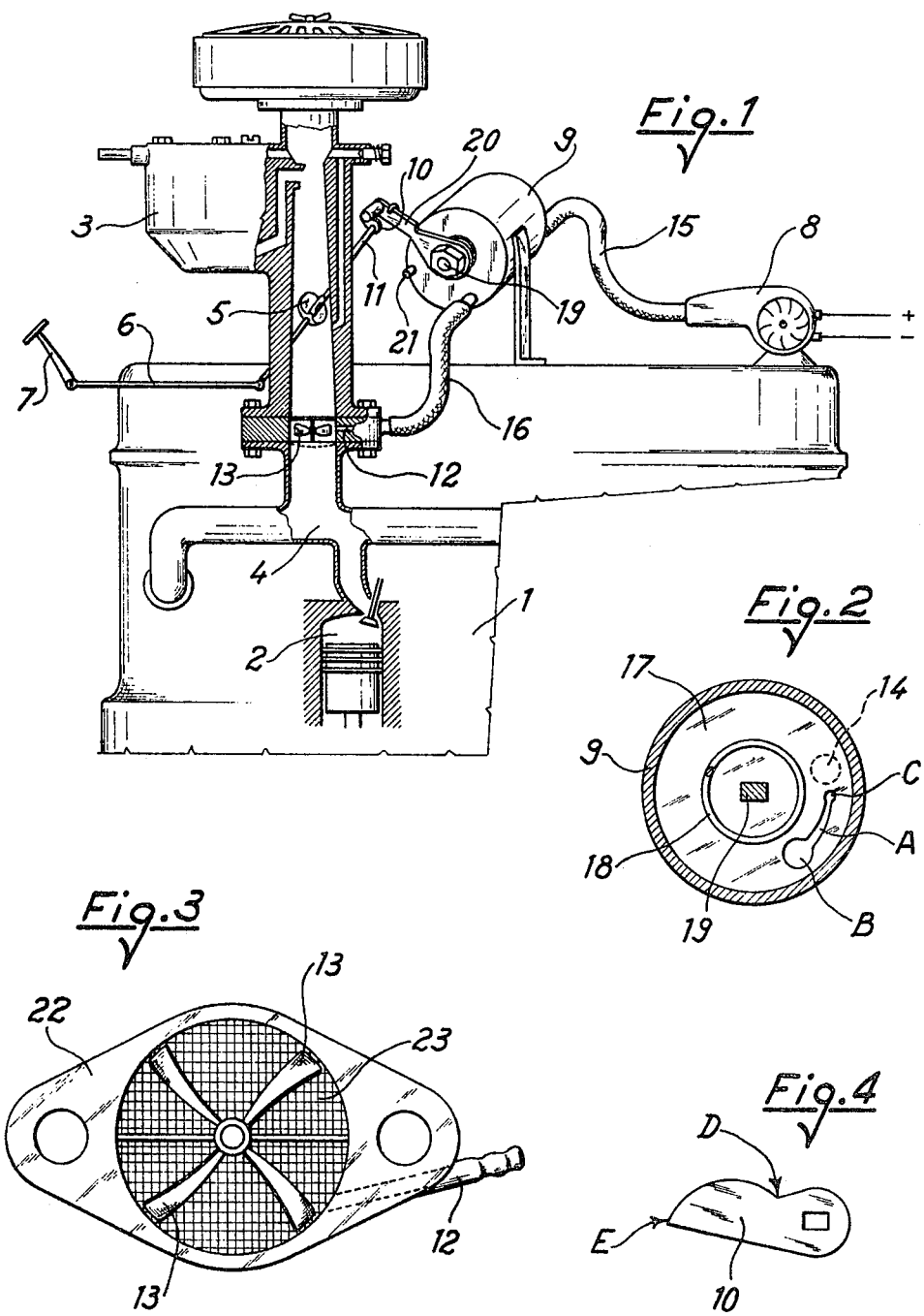

DEVICE FOR IMPROVED EFFICIENCY IN INTERNAL COMBUSTION

This invention relates to a device for improved efficiency in internal combustion engines.

It is well known that the efficiency of internal combustion engines, particularly engines for motor-vehicles, is low and highly variable depending on engine r.p.m. Low engine efficiency is to be found in that, at the various r.p.m., an optimum ratio of fuel (gasoline) and oxygen (air) and perfect atomization and mixing of fuel with air is not achieved. This leads to much higher fuel consumptions than theoretically required, achievement of somewhat lower powers than those to be expected with a perfect fuel combustion, building up of deposits and cokings due to at least partially unburnt hydrocarbons, and irregular variation of the engine power as engine r.p.m. is varied.

It has been proposed to obviate some of the above mentioned disadvantages by applying air compressors to internal combustion engines, such compressors supplying the induction ducts of engine cylinders with additional air (in addition to air from common carburetors) in a constant amount or constantly increasing amounts as r.p.m. increases. Thus, high powers were achieved, but fuel consumption was far higher than the power increase and, as a result, there was a decrease in the energy efficiency.

It has been also proposed to interpose one or more nozzles or atomizers between the carburetor and induction ducts of the cylinders, each of which nozzles or atomizers comprises a propeller rotably driven by the air-fuel mixture from the carburetor. On rotating, this propeller would perfrom the function of atomizing air-borne fuel droplets and homogeneously mixing such air and fuel. However, such a device provided to be substantially unsatisfactory since power losses due to a braking action imparted by the propeller to the passage of the air-fuel mixture impaired or annulled the advantages resulting from an improved homogeneity of the mixture.

A primary object of the present invention is to provide a device for improving the efficiency of internal combustion engines, particularly for reducing the fuel consumption under with equal energy efficiency of the engines.

Another object of the invention is to provide a device of the above design, which device is of a low production cost of, and can easily and readily be applied to any internal combustion engines, particularly engine of motor-vehicles.

These and still other objects are accomplished by a device comprising an air compressor, a passage for admitting air from the compressor into the intake manifold of the engine cylinders downstream of the engine carburetor, a regulator for air flow from the compressor to said passage, and a rigid element rotatably connected to the carburetor throttle and acting upon said regulator for controlling the degree of opening thereof, said rigid element and regulator being shaped for the passage of for the maximum amount of air at the maximum opening of the throttle, a passage of a decreasing amount of air from a lower rate than that maximum amount to a minimum rate at a decreasing r.p.m. of the engine from that at which it provides a maximum torque to those of a lower rate than said maximum torque, and the passage of a larger amount of air than said minimum rate and less than said maximum rate at a minimum opening of the carburetor throttle.

In order that the structure and features of the device according to the invention will be more clearly understood, a preferred embodiment of the device will now be described by way of unrestrictive example, reference being had to the accompanying drawing, in which:

FIG. 1 is a diagrammatic, partly sectional view showing a device according to the invention as applied to a motor-vehicle engine;

FIG. 2 is a sectional view of a valve forming part of the device according to the invention;

FIG. 3 is a plan view showing an atomizing and mixing element of the device according to the invention; and FIG. 4 is a view showing a valve-operating cam of the device according to the invention.

FIG. 1 of the accompanying drawing schematically shows a portion of an internal combustion engine 1, wherein a cylinder 2 is connected through an induction duct or manifold 4 to a carburetor 3.

The carburetor, as commonly used in motor-vehicle engines, comprises a throttle 5, the opening of which is controlled by a tie-rod 6 operated by a pedal 7 (accelerator pedal) and/or a manually operated lever.

As well known, depending on the position of throttle 5, the carburetor controls the formation of an air-fuel mixture which is drawn or sucked by the engine cylinders through said induction duct 4. This mixture is particularly rich in fuel at the time of engine starting and when passing from lever to maximum torque of the engine, that is during acceleration at which time many carburetors also provide the operation of a pickup pump enriching the fuel mixture.

Still referring to FIG. 1, there is diagrammatically shown a device according to the device, such device comprising an air compressor 8, a valve 9, a cam 10 keyed to a shaft 11 of throttle 5 and operating said valve 9, a passage 12 for admitting air from valve 9 to induction manifold 4, and, as a preferential but also highly significant element, a rotating propeller 13 intercepting the flow of air-fuel mixture from the carburetor.

Preferably, said air compressor 8 comprises a centrifugal pump operated by an electric motor supplied by the electric storage battery (not shown in the drawing) forming part of any motor-vehicle; it being however apparent that the compressor may be of a different structure and driven by any suitable movable element of the engine.

Valve 9 comprises a small hollow cylindrical body which at the ends is closed by two caps at each of which a hole is provided. The hole of one of said two caps, designated by reference numeral 14 in FIG. 2 where the valve is shown in cross-sectional view, is connected through a short conduit 15 to the outlet of compressor 8, whereas the hole in the other cap of the valve is connected through a short conduit 16 to passage 12.

A small disc 17 (FIG. 2) is accomodated within the cylindrical body of the valve and is urged against that valve end cap having said hole 14 by a spring 18. Furthermore, said small disc 17 is keyed onto a rotating spindle 19 on which a lever 20 extending externally of the valve is also keyed, this lever being urged by a return spring against a pawl 21 under the conditions at which said throttle 5 is closed.

As shown in FIG. 2, a shaped hole passes through said small disc 17 and has a length A of decreasing section from an end B, where said hole has a maximum section, to an end C, where the section of said hole is smaller than that at B, but larger than the section of length A adjacent said end C.

When valve 5 is closed, that is when the engine is dead or off, the valve has the attitude or position as shown in FIG. 2, that is to say, the hole of small disc 17 is not in overlapping relationship with hole 14, so that said valve is closed. As said throttle 5 opens, shaft 11 will rotate, as well as cam 10, the latter acting upon lever 20, thus causing small disc 17 to rotate and produce overlapping on hole 14 first of said length C, then lengths A and B of the small hole in the disc.

Between location D on cam 10, is the contacting position with lever 20 when throttle 5 and valve 9 are closed, and its location E, is in the contacting position with said lever 20 when the throttle and valve are open to maximum extension, said cam 10 is of such a shape that, under the same magnitude of rotation of shaft 11, said cam causes lever 20 and spindle 19 to rotate to a larger extent when said throttle is nearly closed than when it is nearly fully open. In other words, first a faster and then a slower opening of valve 9 will correspond to gradual opening of throttle 5.

Passage 12, through which air from valve 9 is added to the mixture from the carburetor, is provided in a rigid block 22, which can be simply and easily mounted between the lower end of the carburetor and the upper end of the engine intake manifold 4. A hole is formed through block 22 having the same section as that of the carburetor and intake manifold holes, forming a continuation or connection therefor. This hole in block 22 has centrally therein a multi-blade propeller 13, which is carried by two thin cross arms or webs and freely rotatable about its own axis which is normally vertically arranged. Passage 12 is so configurated that the air jet passing therethrough will directly impinge against the blades of propeller 13, whereby the latter is vortically rotated.

Finally, it should be noted that below propeller 13 said block 22 carries a thin safety barrier or wire gauze 23 performing the function of preventing any propeller blade piece, in the case of breakage, from reaching cylinders 2 and causing damage thereto. Of course, said compressor 8 is further provided with a filter (not shown) inhibiting any passage of dust or solid granules to valve 9.

Under stop or off conditions of the engine, said throttle 5 is closed, compressor 8 is inoperative and valve 9 is also closed (FIG. 2) with lever 20 bearing on pawl 21.

At engine start, the operation of the compressor is immediately commenced and cam 10 readily carries length C of the hole in said small disc 17 of the valve to overlap hole 14: under these conditions (wherein the almost closed throttle exerts a high throttling action on the air passage to the carburetor where a mixture is built up highly enriched of fuel), through the valve passes an amount of air which passes through passage 12, causes a high rotation of propeller 13 and is added to the air-fuel mixture from the carburetor. Upon fast rotation, said propeller 13 will atomize the fuel droplets and perfectly mix the same with air: this homogenous mixture succeeds in completely filling up the cylinders, which would not be the case should the device not be used, since throttle 5 affords the passage of a small amount of air.

As the throttle opening is increased, that is when passing from lower to maximum torque of the engine, or still when accelerating, length A of hole of small disc 17 will overlap hole 14: at the beginning of this stage, the valve allows for passage of a smaller amount of air than when the throttle was nearly closed (thus, during pickup, the mixture should be particularly enriched with fuel), then the air passage increases until a maximum rate is achieved when length B of said hole of small disc 17 overlaps hole 14.

It is important to note that the inflow of air from the compressor is not obstructed by throttle 5, relative to which said passage 12 is always in the downstream direction.

It is also important to note that the shaped contour or outline of cam 10 between locations D and E should be preferably experimentally provided, since an optimum contour or outline would depend on the compression ratio and other characteristics of the engine.

From a great deal of tests, carried out on motor-vehicles of different displacements and makes, even those supplied with liquified petroleum gases, it is found that when using a device as herein described very high savings in fuel consumption (an average of 20% or higher) can be attained relative to the consumption of the same motor-vehicle at unaltered speed and performances. It was also found that the power of engines fitted with the device of the invention is increased relative to that attainable without said device.

What I claim is:

1. In a device for improved efficiency in internal combustion engines of the type having a carburetor adapted for supply of an air-fuel mixture to the intake manifold of the cylinders and of throttle valve between the carburetor and the intake manifold, the improvement comprising an air compressor, a passage for admitting air from the compressor into the intake manifold of the engine downstream of the carburetor, regulator means having a variable opening for controlling the air flow from the compressor to said passage, and means rotatably connected to the throttle and acting upon said regulator means for controlling the degree of opening thereof, said regulator means and said means acting thereon being constructed and arranged to provide flow of a predetermined amount of air to said passage when the throttle valve is at a minimum open position, then to provide to said passage a decreased flow of air to an amount less than the predetermined amount as the throttle valve is opened and then to provide a gradually increasing amount of air as the throttle is further opened reaching an amount greater than said predetermined amount and then providing a substantially increased flow of air at maximum opening of the throttle valve.

2. A device as claimed in claim 1 comprising a rigid block mounted between the carburetor and the intake manifold and providing a continuous connection therebetween for flow of the air-fuel mixture, said passage being formed in said block, a propeller being freely rotably mounted in said block in facing relation to said passage with the latter tangential to the propeller.

3. A device as claimed in claim 1 wherein said means acting on the regulator means comprises a cam driven by the throttle valve and having a contour to produce an initial faster opening of the regulator means and then a slower opening as the throttle valve is gradually opened from the closed position thereof.

4. A device as claimed in claim 1 wherein said regulator means comprises an air outlet from said compressor, an inlet to said passage, and a plate adjacent said outlet for controlling air flow from the outlet to the inlet, said plate having a hole therein which is out of registry with said outlet when the throttle is closed, said hole having a first aperture of given size which registers with said inlet when the throttle is in its position of minimum throttle opening, said hole further having a slot of increasing size extending from said first aperture, said slot having a smaller size than said aperture at the juncture therewith, said hole further having a second aperture joined to the slot at the end thereof of largest size, said second aperture having a size greater than the largest size of the slot.

* * * * *